US012409627B2

(12) United States Patent
Huh et al.

(10) Patent No.: US 12,409,627 B2
(45) Date of Patent: Sep. 9, 2025

(54) SIDE PAPER FEEDING APPARATUS FOR FEEDING RAW SIDE PAPER FOR PAPER CUP MANUFACTURING

(71) Applicant: HYUNJIN CO., LTD, Ansan-si (KR)

(72) Inventors: Sung Hak Huh, Seoul (KR); Jin Yang Jung, Anyang-si (KR); Hyun Sung Jung, Incheon (KR); Chang Woo Kim, Incheon (KR); Chan Woong Moon, Siheung-si (KR); Jong Woo Jeon, Incheon (KR)

(73) Assignee: HYUNJIN CO., LTD., Ansan-si (KR)

( * ) Notice: Subject to any disclaimer, the term of this patent is extended or adjusted under 35 U.S.C. 154(b) by 519 days.

(21) Appl. No.: 17/296,916

(22) PCT Filed: Nov. 30, 2018

(86) PCT No.: PCT/KR2018/015156

§ 371 (c)(1),
(2) Date: May 25, 2021

(87) PCT Pub. No.: WO2020/111354

PCT Pub. Date: Jun. 4, 2020

(65) Prior Publication Data

US 2022/0288882 A1 Sep. 15, 2022

(30) Foreign Application Priority Data

Nov. 29, 2018 (KR) ........................ 10-2018-0150269

(51) Int. Cl.

| | |
|---|---|
| ***B31B 50/07*** | (2017.01) |
| ***B65H 5/12*** | (2006.01) |
| *B31B 110/10* | (2017.01) |

(52) U.S. Cl.
CPC ............... *B31B 50/07* (2017.08); *B65H 5/12* (2013.01); *B31B 2110/10* (2017.08); *B65H 2406/341* (2013.01)

(58) Field of Classification Search
CPC ......... B31B 50/07; B31B 50/10; B31B 50/06; B31B 50/04; B31B 2110/10; B65H 5/12; B65H 2406/341

(Continued)

(56) References Cited

U.S. PATENT DOCUMENTS 4,194,442 A * 3/1980 Martelli ................. B65H 3/085 414/737
5,061,231 A * 10/1991 Dietrich ................ B65B 43/265 493/317

(Continued)

FOREIGN PATENT DOCUMENTS

DE 3941866 A1 * 12/1989
KR 20120017119 A 2/2012

(Continued)

OTHER PUBLICATIONS

International Search Report issued in counterpart PCT application No. PCT/KR2018/015156, Aug. 16, 2019, 4 pp.

*Primary Examiner* — Sameh Tawfik
(74) *Attorney, Agent, or Firm* — Kaplan Breyer Schwarz, LLP

(57) ABSTRACT

A side paper feeding device includes a shuttle cam rotating in conjunction with a drive shaft and driving a shuttle plate. The device further includes a driving cam module, and a side paper transporting arm module. The shuttle cam, the driving cam module, and the side paper transporting arm module are operatively coupled to enable the shuttle plate to feed side paper to a paper cup forming device.

4 Claims, 11 Drawing Sheets

(58) Field of Classification Search
USPC ........................................................... 493/52
See application file for complete search history.

(56) References Cited

U.S. PATENT DOCUMENTS

| | | | | | |
|---|---|---|---|---|---|
| 5,431,274 | A * | 7/1995 | Schaupp | B65C 9/14 | 198/474.1 |
| 5,715,657 | A * | 2/1998 | Mondani | B31B 50/80 | 53/381.1 |
| 8,047,530 | B2 * | 11/2011 | Harston | B65B 43/185 | 271/99 |
| 8,602,956 | B2 * | 12/2013 | Monti | B65B 43/265 | 493/309 |
| 8,919,533 | B2 * | 12/2014 | Speck | B65B 43/265 | 198/469.1 |
| 2007/0257416 | A1 * | 11/2007 | Ford | B65B 43/185 | 271/91 |
| 2013/0161892 | A1 * | 6/2013 | Krueger | B31B 50/07 | 271/3.14 |
| 2021/0380284 | A1 * | 12/2021 | Holderman | B65B 37/06 | |
| 2023/0207375 | A1 * | 6/2023 | Nakashima | H01L 21/68728 | 438/800 |

FOREIGN PATENT DOCUMENTS

| | | | |
|---|---|---|---|
| KR | 20130005782 | U | 10/2013 |
| KR | 101848911 | B1 | 5/2018 |

* cited by examiner

1000

SIDE PAPER FEEDING APPARATUS FOR FEEDING RAW SIDE PAPER FOR PAPER CUP MANUFACTURING

FIELD OF THE DISCLOSURE

The present disclosure relates to a side paper feeding device for feeding side paper to manufacture paper cups; and more particularly, to the side paper feeding device which allows supply of the side paper for manufacturing the paper cups at a lower position of a paper cup forming device in a stable and precise manner.

BACKGROUND OF THE DISCLOSURE

In general, paper cups are made of a trapezoidal side paper and a bottom paper bonded to the bottom of a smaller diametric part of the side paper, and are used in various ways in our lives.

In particular, the paper cups are widely used not only for simply storing beverages, but also for storing foods such as instant rice or cup noodles.

As a method for improving production efficiency of manufacturing the paper cups as such, as disclosed in Korean Patent Publication No. 10-2012-0017119, a supplying device for supplying the side paper to a paper cup forming device by holding the side paper loaded in a magazine through suction pads and placing the side paper on a shuttle capable of performing a reciprocating motion is widely used.

However, in such a conventional supplying device, the magazine for loading the side paper is installed on a base plate of the paper cup forming device, that is, in an upper part of a main body where a turret is installed. As a result, if a large amount of the side paper is placed on a conveyor that supplies the side paper to the magazine, workers have difficulties since a height of the large amount of the side paper is too big.

In addition, in the conventional supplying device, in order to adjust a position of a rotary, it is necessary to release and recombine bolts and nuts fixing the rotary to a post, therefore, such an adjustment is time-consuming and exhausting for the workers.

Also, there is a problem in that the side paper cannot be supplied to a precise location because the side paper must be held and released while the rotary still rotates.

SUMMARY OF THE DISCLOSURE

It is an object of the present disclosure to solve all the aforementioned problems.

It is another object of the present disclosure to provide a side paper feeding device that allows a worker to easily load a large amount of side paper onto a conveyor which supplies the side paper to a magazine.

It is still another object of the present disclosure to provide the side paper feeding device that allows the side paper to be supplied to a precise location.

It is still yet another object of the present disclosure to provide the side paper feeding device that allows easy adjustment of a position of a rotary for transporting the side paper.

In order to accomplish the objects above, distinctive structures of the present disclosure are described as follows.

In accordance with one aspect of the present disclosure, there is provided a side paper feeding device for feeding side paper to manufacture paper cups, including: a shuttle cam rotating in conjunction with a drive shaft and driving a shuttle plate capable of transporting the side paper located on an upper part thereof to a paper cup forming device in a horizontal reciprocating direction; a driving cam module, formed on a lower part of the shuttle cam, including a rotary cam, an oscillator cam and links arms, wherein the rotary cam formed on a rotation shaft fixedly coupled to the shuttle cam intermittently rotates a first turret, wherein the oscillator cam formed on the rotation shaft oscillates a second turret, and wherein the link arms whose respective one side ends are coupled to a first end of a first shaft of the first turret and to a first end of a second shaft of the second turret are rotatably coupled to each other at respective other side ends thereof; and a side paper transporting arm module including an arm plate, rotating arms, sub-arms and a track cam, wherein the arm plate is coupled to one end of the first turret, wherein the rotating arms are rotatably coupled at equal intervals to an outer circumferential surface of the arm plate at respective one side ends thereof, wherein the sub-arms, where suction pads for holding and releasing the side paper by vacuum are formed, are fixedly coupled to respective other side ends of the rotating arms in a direction perpendicular to the rotating arms, and wherein the track cam coupled to a second end of the first shaft of the first turret allows the sub-arms to move reciprocally, on a plane of the outer circumferential surface of the arm plate, in a section between a first point where a specific suction pad among the suction pads holds the side paper from a magazine and a second point where the side paper is released on the upper part of the shuttle plate.

As one example, a body of the shuttle cam is formed in a shape of a plate, wherein a circumferential gear, for engaging a driving gear coupled to the drive shaft, is formed on an exterior circumferential side of the body, and wherein a plate-shaped cam is formed on the body.

As one example, the side paper feeding device further includes a lift, formed on a lower area of the driving cam module, for adjusting a position of the shuttle plate, corresponding to the paper cup forming device, by adjusting a vertical position and a horizontal position of the driving cam module.

As one example, a cam profile, for changing positions of cam followers formed on said other side ends of the rotating arms or on the sub-arms, is formed on an area of the track cam wherein the area of the track cam corresponds to the section where the specific suction pad holds and releases the side paper.

As one example, a groove, corresponding to a pitch curve, is formed on one side of a track cam plate of the track cam.

As one example, the shuttle plate has a form of a fork in an area located on a moving path of the suction pads.

BRIEF DESCRIPTION OF THE DRAWINGS

The following drawings to be used for explaining example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
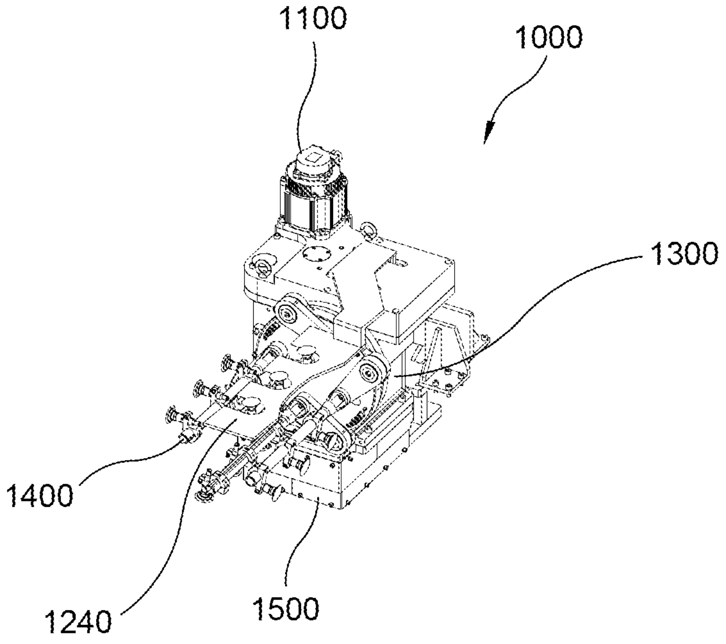
FIG. 1 is a perspective view schematically illustrating a side paper feeding device for supplying side paper to manufacture paper cups in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure.

In the drawings, thickness is enlarged in order to clearly express various lavers and regions. When a part of a layer, membrane, region, plate, etc. is said to be "above" another part, this statement includes not only a case where the part is "directly above" said another part, but also a case where yet another part is present between the part and said another part. Meanwhile, when the part is "directly above" said another part, this indicates that nothing is present between the part and said another part. In addition, when the part is formed "over" said another part, this means not only a case where the part is formed on an entire surface of said another part, but also a case where the part is not formed on an edge of said another part.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained in detail by referring to attached diagrams as shown below.

FIG. 1 is a perspective view schematically illustrating a side paper feeding device for supplying side paper to manufacture paper cups in accordance with one example embodiment of the present disclosure. And, FIG. 2 is an exploded view schematically illustrating the side paper feeding device for supplying the side paper to manufacture the paper cups in accordance with one example embodiment of the present disclosure.

Figure 2:
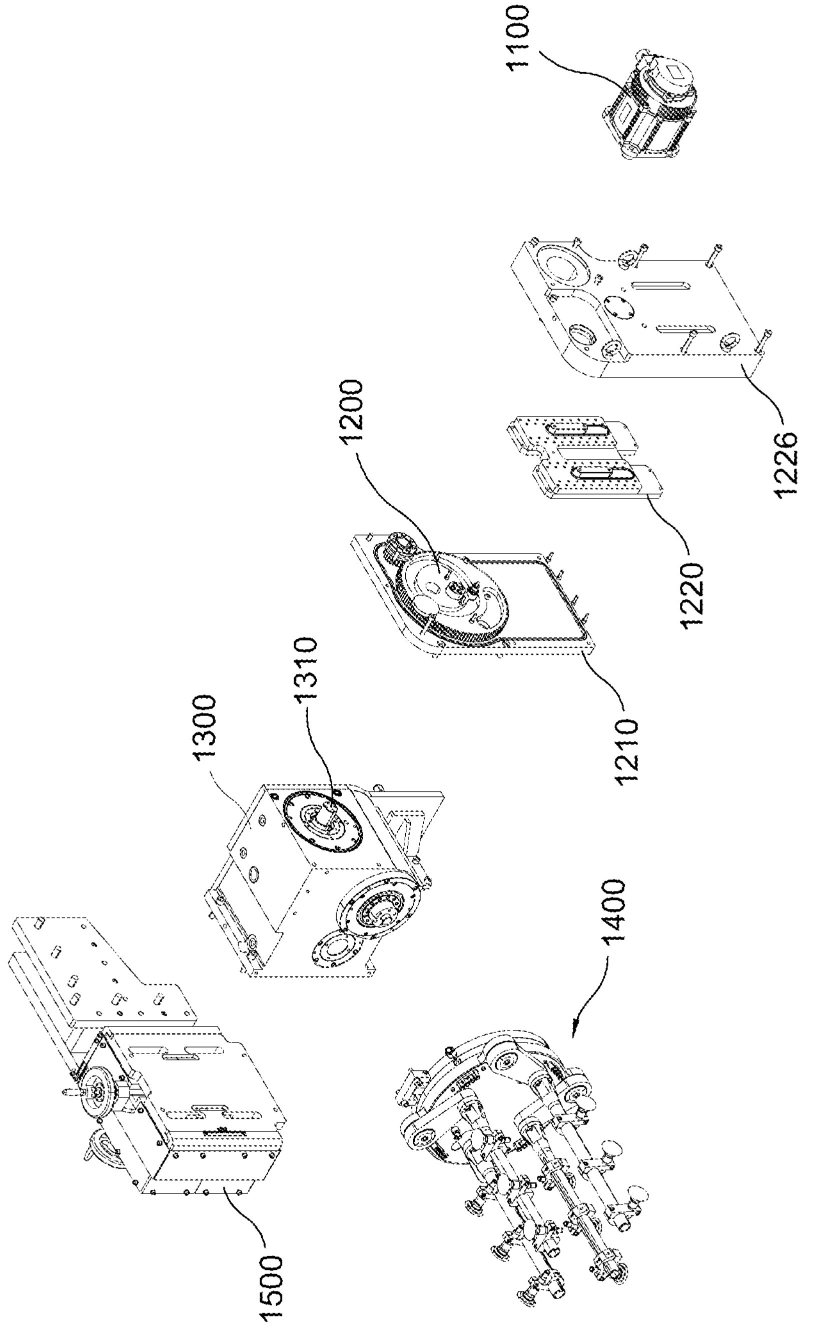
FIG. 2 is an exploded view schematically illustrating the side paper feeding device for supplying the side paper to manufacture the paper cups in accordance with one example embodiment of the present disclosure.

By referring to FIGS. 1 and 2, the side paper feeding device 1000 may include a shuttle cam 1200, a driving cam module 1300, and a side paper transporting arm module 1400.

First, the shuttle cam 1200 may rotate in conjunction with a drive shaft 1110 of a driving source 1100 and may drive a shuttle plate 1240 capable of transporting the side paper located on an upper part thereof to a paper cup forming device (not illustrated) in a horizontal reciprocating direction.

As an example, the shuttle cam 1200 may be installed in a cut area of a plate 1210 such that the shuttle cam is coupled to the drive shaft of the driving source 1100 such as a servo motor, and a cam follower of a driving plate 1220 may be engaged with a cam area of the shuttle cam 1200.

Figure 3:
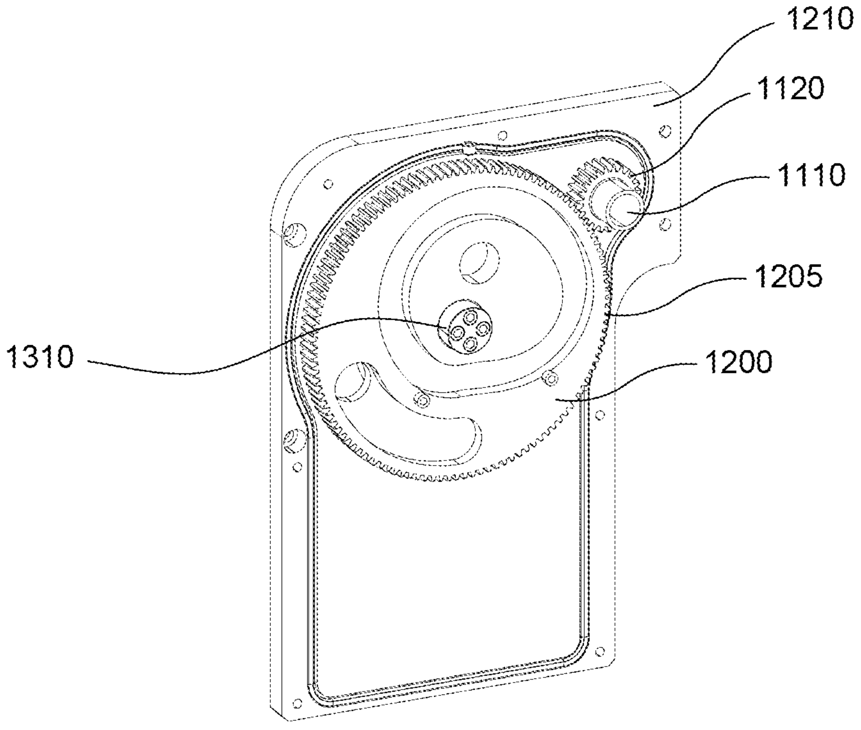
FIG. 3 is a drawing schematically illustrating a combining state between a shuttle cam and a drive shaft of the side paper feeding device for supplying the side paper to manufacture the paper cups in accordance with one example embodiment of the present disclosure.
Figure 4:
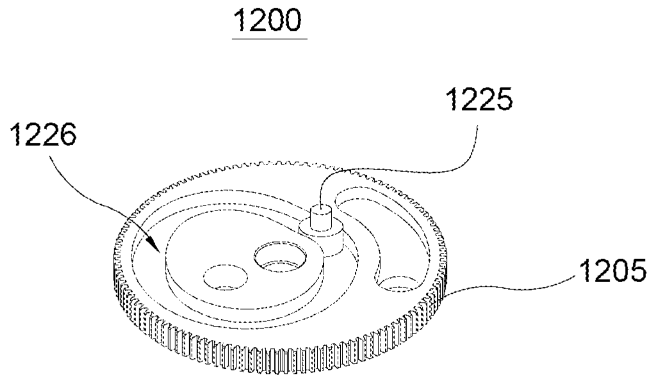
FIG. 4 is a drawing schematically illustrating the shuttle cam of the side paper feeding device for supplying the side paper to manufacture the paper cups in accordance with one example embodiment of the present disclosure.

That is, by referring to FIGS. 3 and 4, a body of the shuttle cam 1200 may be formed in a shape of a plate, and the shuttle cam 1200 may be installed on the cut area of the plate 1210, and a rotation shaft 1310 may be fixedly coupled to the shuttle cam 1200. Herein, a circumferential gear 1205 may be formed on an exterior circumferential side of the shuttle cam 1200. Further, the circumferential gear 1205 may be engaged with a driving gear 1120 and rotated by a driving force of the driving source 1100. Herein, the driving gear 1120 may be installed in another cut area of the plate 1210 and coupled to the drive shaft 1110 of the drive source 1100. And a cam of the shuttle cam 1200 may be formed as a plate-shaped cam. Further, a groove 1226, corresponding to a pitch curve, may be formed in a body area of the shuttle cam 1200. A cam follower 1225 of the driving plate 1220 may be engaged with the groove 1226 of the shuttle cam 1200, thereby allowing the driving plate 1220 to move reciprocally in response to a rotation of the cam follower 1225.

Also, the shuttle plate 1240 may be coupled to the driving plate 1220. Then the shuttle plate 1240 may move forward in a linear motion in conjunction with a rotation of the shuttle cam 1200 while the side paper is located on the upper part thereof, thereby transporting the side paper to a gripper of the paper cup forming device. Then the gripper of the paper cup forming device may grip the side paper on the upper part of the shuttle plate 1240 and transport it to a next process for manufacturing the paper cups. Thereafter, in conjunction with the rotation of the shuttle cam 1200, the shuttle plate 1240 may move backward in the linear motion and return to its original position in order to receive the next side paper. Herein, in a section where the side paper is transported by the gripper of the paper cup forming device, the shuttle plate 1240 may maintain a stationary state due to a dwell of the shuttle cam 1200, and accordingly, the gripper of the paper cup forming device may securely grip the side paper on the upper part of the shuttle plate 1240.

Figure 5:
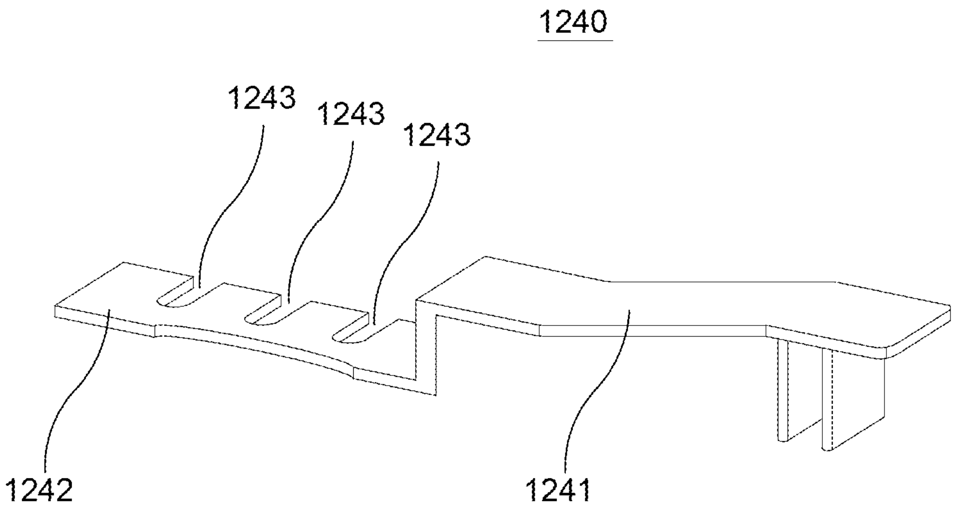
FIG. 5 is a drawing schematically illustrating a shuttle plate of the side paper feeding device for supplying the side paper to manufacture the paper cups in accordance with one example embodiment of the present disclosure.

Herein, by referring to FIG. 5, the shuttle plate 1240 may be coupled to the shuttle cam 1200, for example, to the driving plate 1220 on which the cam follower 1225 engaged with the shuttle cam 1200 is installed. Herein, the shuttle plate 1240 may be coupled to the driving plate 1220 through a sliding groove of a cover 1230.

In addition, the shuttle plate 1240 may be installed to maintain a preset vertical distance from suction pads of the side paper transporting arm module 1400 to be described later. Herein, the shuttle plate 1240 may include (i) a connecting part 1241 coupled to the driving plate 1220 and (ii) a side paper gripping part 1242 for gripping the side paper. And the connecting part 1241 and the paper gripping part 1242 may be formed to have a step relative to each other, to thereby allow easy adjustment of the preset vertical distance from the suction pads of the side paper transporting arm module 1400.

And, the shuttle plate 1240, for example, the side paper gripping part 1242, may have a fork-shape 1243 in an area located on moving paths of the suction pads of the side paper transporting arm module 1400. And while the suction pads of the side paper transporting arm module 1400 are positioned in the area of the fork-shape 1243 on the shuttle plate 1240, the shuttle plate 1240, for example, the side paper gripping part 1242, may allow the side paper gripped, e.g., held by vacuum, to be located on the upper part of the shuttle plate 1240.

Next, the driving cam module 1300 may be formed on a lower part of the shuttle cam 1200. Herein, the driving cam module 1300 may include (i) a rotary cam 1320, formed on the rotation shaft 1310 fixedly coupled to the shuttle cam 1200, for intermittently rotating a first turret 1330, (ii) an oscillator cam 1340, formed on the rotation shaft 1310, for oscillating a second turret 1350, and (iii) link arms 1360 and 1370 whose respective one side ends are coupled to a first end of a first shaft of the first turret 1330 and to a first end of a second shaft of the second turret 1350 and whose respective other side ends are rotatably coupled to each other.

Figure 6:
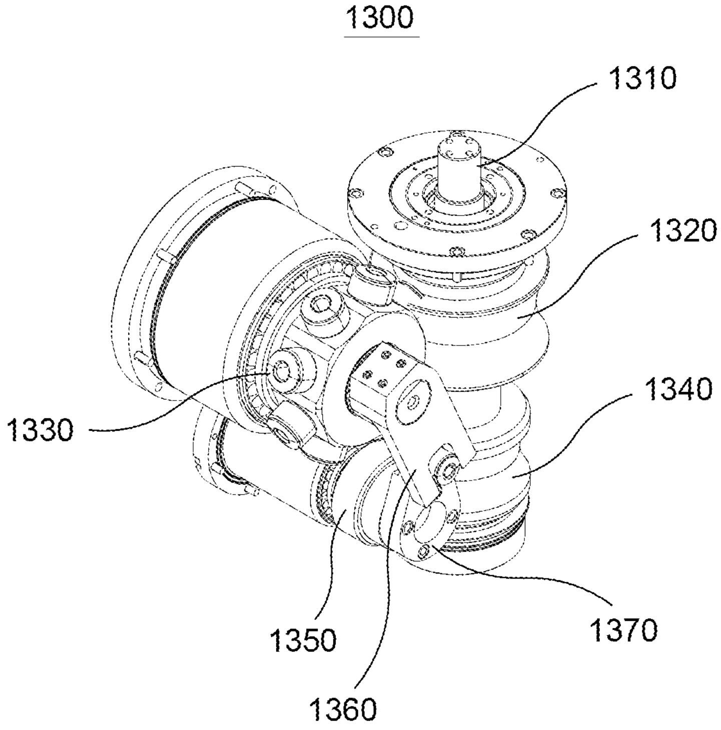
FIG. 6 is a drawing schematically illustrating a driving cam module of the side paper feeding device for supplying the side paper to manufacture the paper cups in accordance with one example embodiment of the present disclosure.

As an example, by referring to FIG. 6, the rotary cam 1320 and the oscillator cam 1340 may be sequentially coupled to the rotation shaft 1310 which is fixedly coupled to the shuttle cam 1200. And, the first turret 1330, where cam followers are formed on a circumference of a first side end thereof, may be coupled to the rotary cam 1320, and the first turret 1330 may repeat rotation and stop in response to the rotation of the rotary cam 1320. Also, the second turret 1350, where at least two cam followers are formed on a circumference of one side end thereof, may be coupled to the oscillator cam 1340, and the second turret 1350 may oscillate within a certain arc length in response to the rotation of the oscillator cam 1340.

And, one end of a first link arm 1360 may be coupled to the first shaft of the first turret 1330, and one end of the second link arm 1370 may be coupled to the second shaft of the second turret 1350. Further, another end of the first link arm 1360 and another end of the second link arm 1370 may be rotatably coupled to each other. Herein, the first shaft of the first turret 1330 may be formed to be rotatable, and the second shaft of the second turret 1350 may be formed to be not rotatable. As another example, said one end of the second link arm 1370 may be coupled to the body of the second turret 1350, instead of the second shaft of the second turret 1350.

Then, the second turret 1350 may oscillate in response to the rotation of the oscillator cam 1340, and the second link arm 1370 may also oscillate in response to the oscillation of the second turret 1350. And, the first link arm 1360 rotatably coupled to the second link arm 1370 may also oscillate, and accordingly, the first shaft of the first turret 1330 may also oscillate.

Next, the side paper transporting arm module 1400 may include (i) an arm plate 1430 coupled to one end of the first turret 1330, (ii) rotating arms 1460 whose respective one side ends are rotatably coupled at equal intervals to an outer circumferential surface of the arm plate 1430, (iii) sub-arms 1470, where the suction pads 1480 for holding and releasing the side paper by vacuum are formed and which are fixedly coupled to respective other side ends of the rotating arms 1460 in a direction perpendicular to the rotating arms 1460, and (iv) a track cam 1440 coupled to a second end of the first shaft of the first turret 1330 and which allows the sub-arms 1470 to move reciprocally, on a plane of the outer circumferential surface of the arm plate 1430, in a section between a first point where a specific suction pad among the suction pads 1480 holds the side paper from a magazine (not illustrated) and a second point where the side paper is released on the upper part of the shuttle plate 1240.

Figure 7:
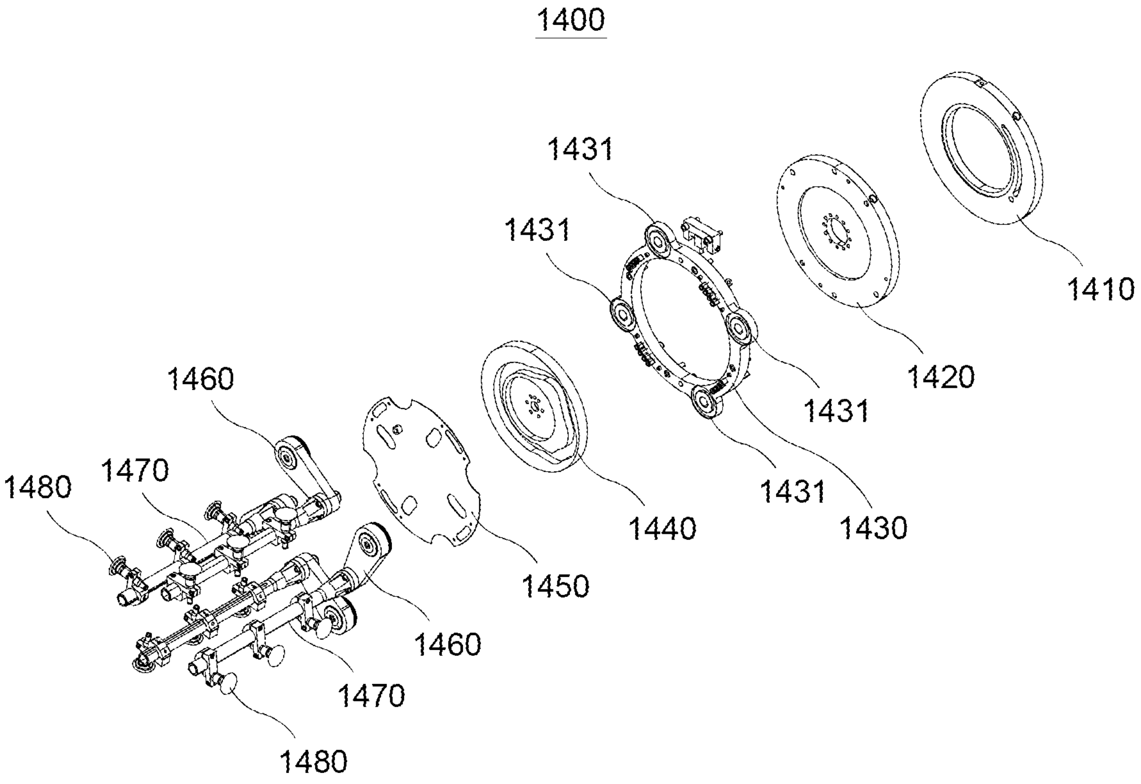
FIG. 7 is an exploded view schematically illustrating a side paper transporting arm module of the side paper feeding device for supplying the side paper to manufacture the paper cups in accordance with one example embodiment of the present disclosure.

As an example, by referring to FIG. 7, (i) a first plate 1410 having a hollow in one end region of the first turret 1330 may be formed and (ii) a second plate 1420 (ii-1) fixedly coupled to the second end of the first turret 1330 through the hollow of the first plate 1410 and (ii-2) having a hollow for allowing a second side end of the first shaft of the first turret 1330 to be inserted may be formed. Herein, an inner space may be formed in an inner region where the first plate 1410 and the second plate 1420 are coupled, and a vacuum may be formed in the inner space. Also, while the inner space where the first plate 1410 and the second plate 1420 are coupled is sealed, the first plate 1410 may maintain a stationary state and the second plate 1420 may intermittently rotate in conjunction with the intermittent rotation of the first turret 1330.

In addition, the arm plate 1430 having the hollow may be fixedly coupled to the second plate 1420. Further, the track cam 1440 may be located in the hollow region of the arm plate 1430, and the track cam 1440 may be fixedly coupled to the second end of the first shaft of the first turret 1330 inserted into the hollow of the second plate 1420. Herein, a cover 1450 on which the respective sliding grooves are formed may be fixedly coupled to the arm plate 1430 to prevent the track cam 1440 from being detached.

Also, (i) the rotating arms 1460 may be coupled at equal intervals to the outer circumferential surface of the arm plate 1430 such that the respective one side ends of the rotating arms 1460 are rotatable and (ii) the sub-arms 1470 may be fixedly coupled to the respective other side ends of the rotating arms 1460 in a direction perpendicular to the rotating arms 1460. Herein, the suction pads 1480 for holding and releasing the side paper by vacuum may be formed on the sub-arms 1470.

Figure 8:
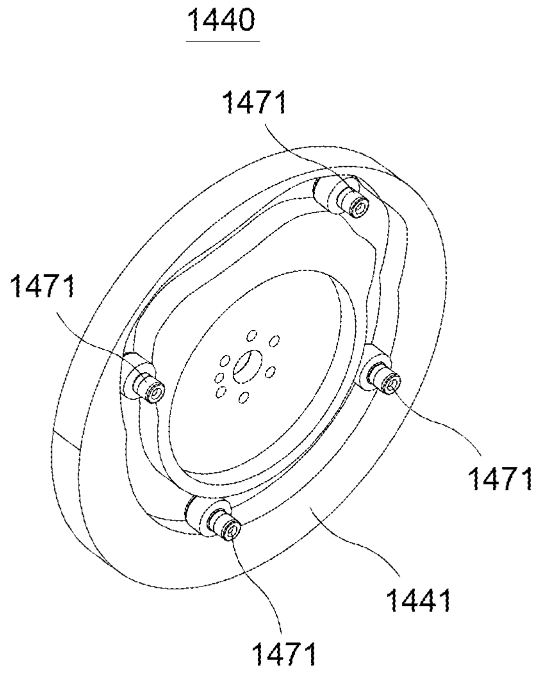
FIG. 8 is a drawing schematically illustrating a track cam of the side paper feeding device for supplying the side paper to manufacture the paper cups in accordance with one example embodiment of the present disclosure.

Herein, by referring to FIG. 8, a cam profile, for changing positions of cam followers 1471 formed on said other side ends of the rotating arms 1460 or on the sub-arms 1470, may be formed only on an area of the track cam 1440. Herein, the area may correspond to the section where the suction pads 1480 hold and release the side paper. And, a groove 1441 corresponding to a pitch curve may be formed on one side of a track cam plate of the track cam 1440, and the cam followers 1471 may be engaged with the groove 1441.

In addition, the side paper feeding device for supplying the side paper to manufacture the paper cups in accordance with the present disclosure may further include a lift 1500, formed on a lower area of the driving cam module 1300, for adjusting a position of the shuttle plate 1240, corresponding to the paper cup forming device, by adjusting a vertical position and a horizontal position of the driving cam module 1300. Herein, a vertical direction control lever and a horizontal direction control lever may be formed on the lift 1500, and the position of the shuttle plate 1240 may be adjusted by a combination of operations of the vertical direction control lever and the horizontal direction control lever.

Figure 9A:
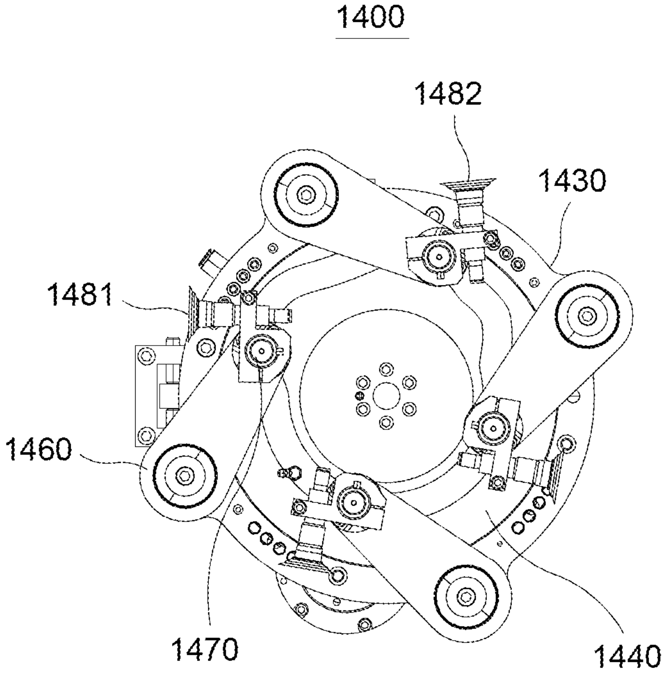
FIGS. 9A to 9C are drawings schematically illustrating operations of the side paper transporting arm module of the side paper feeding device for supplying the side paper to manufacture the paper cups in accordance with one example embodiment of the present disclosure.
Figure 9B:
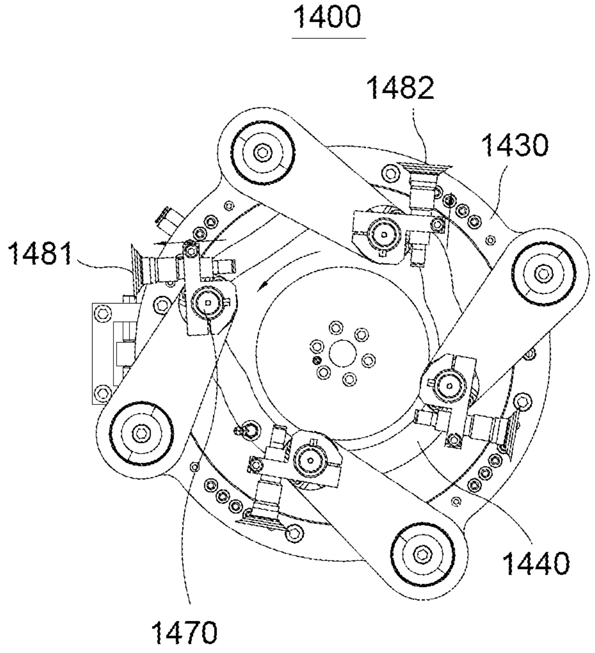
Figure 9C:
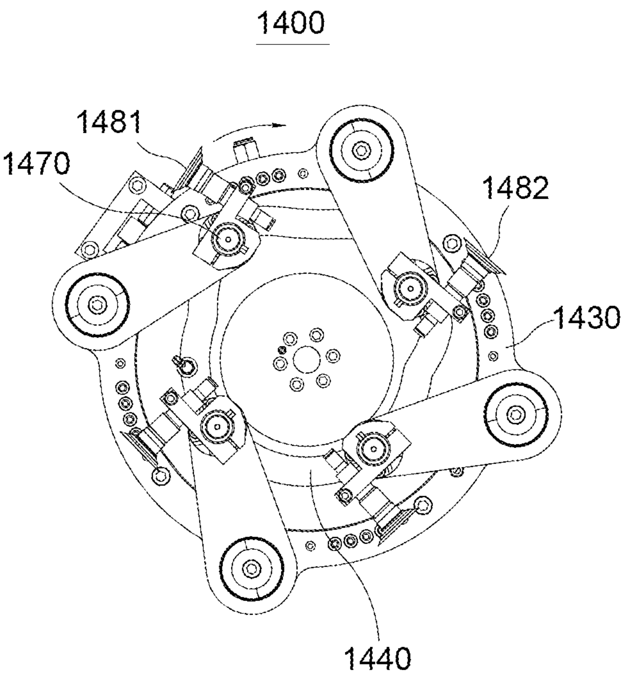

Operations of the side paper feeding device for supplying the side paper to manufacture the paper cups configured as such in accordance with of the present disclosure are described by referring to FIGS. 9A to 9C.

First, by referring to FIG. 9A, while the shuttle plate 1240 is positioned at the lower area of the specific suction pad 1482, that is transported with the side paper held by vacuum, another specific suction pad 1481 may be at the position corresponding to the magazine in which the side paper is stored. Herein, the shuttle cam 1200 may be in the dwell and thus the shuttle plate 1240 may maintain a stationary state, and also, the rotary cam 1320 may be in the dwell and thus the arm plate 1430 may maintain a stationary state.

Next, by referring to FIG. 9B, the track cam 1440 may oscillate in response to the oscillation of the oscillator cam 1340 and may rotate in a predetermined direction (counter-clockwise as shown in the drawing), and accordingly, said another specific suction pad 1481 may hold the side paper stored in the magazine by vacuum through the forward movement. Also, the specific suction pad 1482 having held the side paper by vacuum may move backward, and may release the side paper so that the side paper is positioned on the upper part of the shuttle plate 1240, and the specific suction pad 1482 may be positioned at the lower part of the shuttle plate 1240. Herein, the suction pads 1481 and 1482 may perform the linear movement without rotation, so that the side paper can be held and released securely and precisely.

Next, by referring to FIG. 9C, by the operation of the shuttle cam 1200, the shuttle plate 1240 may move to the position of the gripper of the paper cup forming device in a forward motion while the side paper is located on the upper part thereof, to thereby allow the gripper to transport the side paper. And in response to the operation of the rotary cam 1320, the arm plate 1430 may rotate to thereby allow said another specific suction pad 1481 to move to the position where said another specific suction pad 1481 can supply the side paper held by vacuum to the shuttle plate 1240.

Herein, the track cam 1440 may rotate in a direction opposite to that shown in FIG. 9B, that is, in the same direction as the rotation direction of the arm plate 1430, by the oscillation of the oscillator cam 1340.

Thereafter, the shuttle plate 1240 may be positioned as shown in FIG. 9A through a backward movement, said another specific suction pad 1481 holding the side paper by vacuum may be positioned to supply the side paper to the shuttle plate 1240, and then when a next one of the suction pads is positioned to hold the side paper in the magazine by vacuum, the operations as shown in FIGS. 9B and 9C are repeated, to thereby allow stable supply of the side paper in the magazine to the paper cup forming device.

The present disclosure has an effect of feeding the side paper from a lower part of a base plate of the paper cup forming device, to thereby allow a worker to easily load a large amount of the side paper on a conveyor for providing the magazine with the side paper.

The present disclosure has another effect of holding and releasing the side paper by vacuum while the rotary is stationary, to thereby allow supply of the side paper to a precise location.

The present disclosure has still another effect of improving production efficiency by allowing the worker to easily adjust the position of the rotary and reduce time for adjusting the position of the rotary due to use of the lift.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A side paper feeding device for feeding side paper to manufacture paper cups, comprising:

a shuttle cam rotating in conjunction with a drive shaft and driving a shuttle plate capable of transporting the side paper located on an upper part thereof to a paper cup forming device in a horizontal reciprocating direction;

a driving cam module, formed on a lower part of the shuttle cam, including a rotary cam, an oscillator cam and links arms, wherein the rotary cam formed on a rotation shaft fixedly coupled to the shuttle cam intermittently rotates a first turret, wherein the oscillator cam formed on the rotation shaft oscillates a second turret, and wherein the link arms whose respective one side ends are coupled to a first end of a first shaft of the first turret and to a first end of a second shaft of the second turret are rotatably coupled to each other at respective other side ends thereof; and a side paper transporting arm module including an arm plate, rotating arms, sub-arms and a track cam, wherein the arm plate is coupled to one end of the first turret, wherein the rotating arms are rotatably coupled at equal intervals to an outer circumferential surface of the arm plate at respective one side ends thereof, wherein the sub-arms, where suction pads for holding and releasing the side paper by vacuum are formed, are fixedly coupled to respective other side ends of the rotating arms in a direction perpendicular to the rotating arms, and wherein the track cam coupled to a second end of the first shaft of the first turret allows the sub-arms to move reciprocally, on a plane of the outer circumferential surface of the arm plate, in a section between a first point where a specific suction pad among the suction pads holds the side paper from a magazine and a second point where the side paper is released on the upper part of the shuttle plate;

wherein, a groove, corresponding to a pitch curve, is formed on one side of a track cam plate of the track cam, and cam followers being engaged with the groove, wherein the shuttle plate has a form of a fork in an area located on a moving path of the suction pads, wherein the specific suction pad holding the side paper is moved linearly without rotation from a first point where the shuttle plate is positioned at a lower area of the specific suction pad to a second point where the specific suction pad is positioned at a lower part of the shuttle plate, wherein the specific suction pad is moved through the fork of the shuttle plate and stopped at the second point to thereby release the side paper on a side-paper-gripping part of the shuttle plate.

2. The side paper feeding device of claim 1, wherein a body of the shuttle cam is formed in a shape of a plate, wherein a circumferential gear, for engaging a driving gear coupled to the drive shaft, is formed on an exterior circumferential side of the body, and wherein a plate-shaped cam is formed on the body.

3. The side paper feeding device of claim 1, further comprising a lift, formed on a lower area of the driving cam module, for adjusting a position of the shuttle plate, corresponding to the paper cup forming device, by adjusting a vertical position and a horizontal position of the driving cam module.

4. The side paper feeding device of claim 1, wherein a cam profile, for changing positions of cam followers formed on said other side ends of the rotating arms or on the sub-arms, is formed on an area of the track cam wherein the area of the track cam corresponds to the section where the specific suction pad holds and releases the side paper.

* * * * *